(12) United States Patent
Liu

(10) Patent No.: US 7,519,804 B2
(45) Date of Patent: Apr. 14, 2009

(54) SPLIT READ ONLY MEMORY ARCHITECTURE FOR STORAGE OPTION READ ONLY MEMORIES

(75) Inventor: Wei Liu, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 466 days.

(21) Appl. No.: 11/351,092

(22) Filed: Feb. 9, 2006

(65) Prior Publication Data

US 2007/0186089 A1 Aug. 9, 2007

(51) Int. Cl.
*G06F 9/24* (2006.01)
(52) U.S. Cl. .................................. 713/1; 713/2; 713/100
(58) Field of Classification Search ............. 713/1, 713/2, 100
See application file for complete search history.

(56) References Cited

U.S. PATENT DOCUMENTS

| | | | |
|---|---|---|---|
| 5,887,164 A * | 3/1999 | Gupta | 713/2 |
| 6,282,647 B1 | 8/2001 | Leung et al. | 713/100 |
| 6,356,965 B1 | 3/2002 | Broyles et al. | 710/104 |
| 6,598,159 B1 | 7/2003 | McAlister et al. | 713/2 |
| 6,865,669 B1 * | 3/2005 | Mahmoud | 713/1 |

* cited by examiner

*Primary Examiner*—Tse Chen
(74) *Attorney, Agent, or Firm*—Hamilton & Terrile, LLP; Stephen A. Terrile

(57) ABSTRACT

A method for reducing execution time for a power on self test (POST) of an information handling system which includes providing the information handling system with a split option ROM wherein the split option ROM including an initiator split option ROM and a completer split option ROM, executing the initiator split option ROM upon execution of the POST wherein the initiator split option ROM starts initialization of an option corresponding to the initiator split option ROM, executing the power on self test to initialize a remainder of the information handling system, and executing the completer split option ROM after initializing the remainder of the information handling system wherein the completer option ROM completes initialization of the option corresponding to the completer split option ROM. is disclosed.

15 Claims, 2 Drawing Sheets

SPLIT READ ONLY MEMORY ARCHITECTURE FOR STORAGE OPTION READ ONLY MEMORIES

BACKGROUND OF THE INVENTION

1. Field of the Invention

The present invention relates to information handling systems and more particularly to a split read only memory (ROM) architecture for storage option ROMs to reduce power on self test (POST) time.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Known information handing systems may include one or more peripheral devices such as component interconnect (PCI) type devices including PCI express PCI(e) type devices. The PCI devices may include both embedded devices and plug-in devices. Other types of peripheral devices include redundant array of independent disks (RAID) type devices as well as small computer system interface (SCSI) type devices. The SCSI type devices may include serial attached SCSI (SAS) type devices.

An issue relating to known information handling systems is the time that is required for the information handling system to initialize (i.e., to boot up) when powered on or reset.

Depending on the types and number of peripheral devices present in the system, each system reboot can use a significantly long time to initialize. One significant contributor to the time for system reboot is the execution of option read only memories (ROMs) present in the each plug in device and in the system basic input output system (BIOS). In known information handling systems, the system BOIS option ROM is a single monolithic device.

Known information handling systems may require up to three to four minutes to boot when RAID type cards to which multiple drives are attached are included within the information handling system. Even for a basic SCSI/SAS card, the option ROM can require from 30 seconds to two minutes to execute if drives are connected to the cards. In known information handling systems, a reboot without any option ROM usually takes about 30 seconds to complete. Therefore, the onboard storage option ROMs execution can occupy half or more of the time required for a power on self test (POST).

Known storage drives have a spin-up period when starting from a cold boot. When booting the information handling system, a drive detection algorithm in the option ROM waits for these devices to spin-up before the storage drive can be properly identified by the drive detection algorithm. In known systems, the spin-up time is a function of the individual device and its associated option ROM. This spin-up time is not controlled by the system BIOS. Accordingly, when booting known information handling systems a large amount of the time used for booting up the system is consumed by the storage option ROMs waiting for a response from the storage devices.

SUMMARY OF THE INVENTION

In accordance with the present invention, providing an information handling system with a split option read only memory (ROM), which is used during initialization of the information handling system, reduces the time required to execute a power on self test. The POST execution time reduction can greatly improve customer experience as well as factory throughput.

More specifically, in one embodiment, the invention relates to a method for reducing execution time for a power on self test (POST) of an information handling system which includes providing the information handling system with a split option ROM wherein the split option ROM including an initiator split option ROM and a completer split option ROM, executing the initiator split option ROM upon execution of the POST wherein the initiator split option ROM starts initialization of an option corresponding to the initiator split option ROM, executing the power on self test to initialize a remainder of the information handling system, and executing the completer split option ROM after initializing the remainder of the information handling system wherein the completer option ROM completes initialization of the option corresponding to the completer split option ROM.

In another embodiment, the invention relates to an apparatus for reducing execution time for a power on self test (POST) of an information handling system which includes a split option ROM wherein the split option ROM includes an initiator split option ROM and a completer split option ROM, means for executing the initiator split option ROM upon execution of the POST wherein the initiator split option ROM starts initialization of an option corresponding to the initiator split option ROM, means for initializing a remainder of the information handling system, and means for executing the completer split option ROM after the remainder of the information handling system is initialized wherein the completer option ROM completing initialization of the option corresponding to the completer split option ROM.

In another embodiment, the invention relates to an information handling system which includes a processor, an option coupled to the processor, and a memory coupled to the processor. The memory includes a conventional system option read only memory (ROM) and a split option ROM wherein the split option ROM includes an initiator split option ROM and a completer split option ROM. The split option ROM includes instructions which upon invocation of a power on self test (POST) start initialization of the option corresponding to the initiator split option ROM. The memory includes a POST module which includes instructions which initialize a remainder of the information handling system and the completer split option ROM which includes instructions which complete initialization of the option corresponding to the completer split option ROM after initialization of the remainder of the information handling system so as to reduce execution time for the POST.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Figure 1:
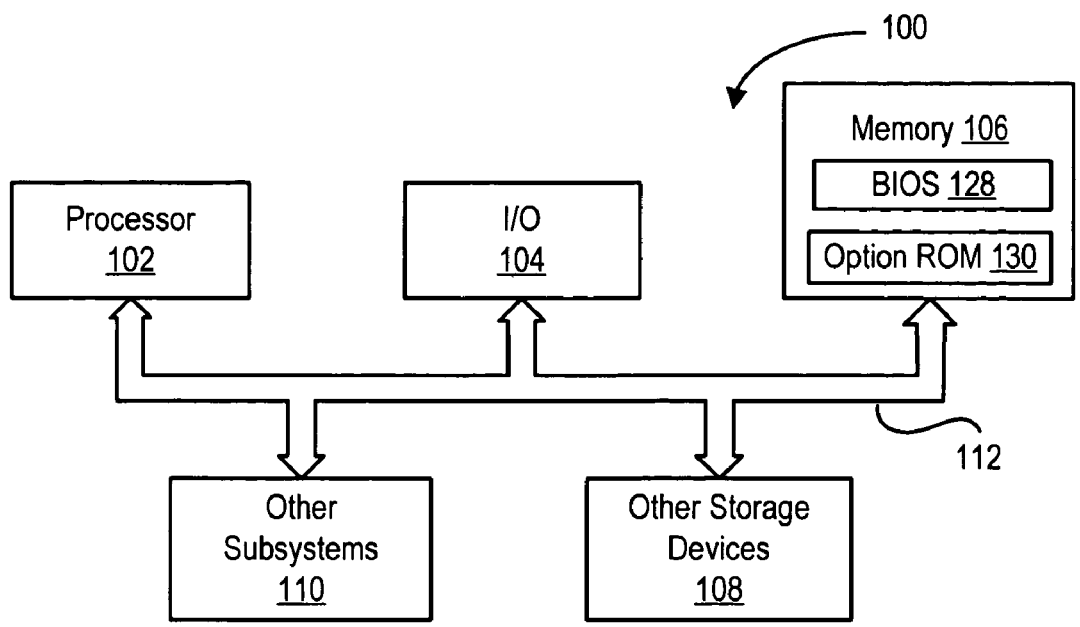
FIG. 1 shows a system block diagram of an information handling system.

Referring briefly to FIG. 1, a system block diagram of an information handling system 100 is shown. The information handling system 100 includes a processor 102, input/output (I/O) devices 104, such as a display, a keyboard, a mouse, and associated controllers, memory 106, including volatile memory such as random access memory (RAM) and non-volatile memory such as read only memory (ROM) and hard disk drives, and other storage devices 108, such as a floppy disk and drive or CD-ROM disk and drive, and various other subsystems 110, all interconnected via one or more buses 112. The memory 106 includes a basic input output system 128 as well as an option ROM 130.

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 2:
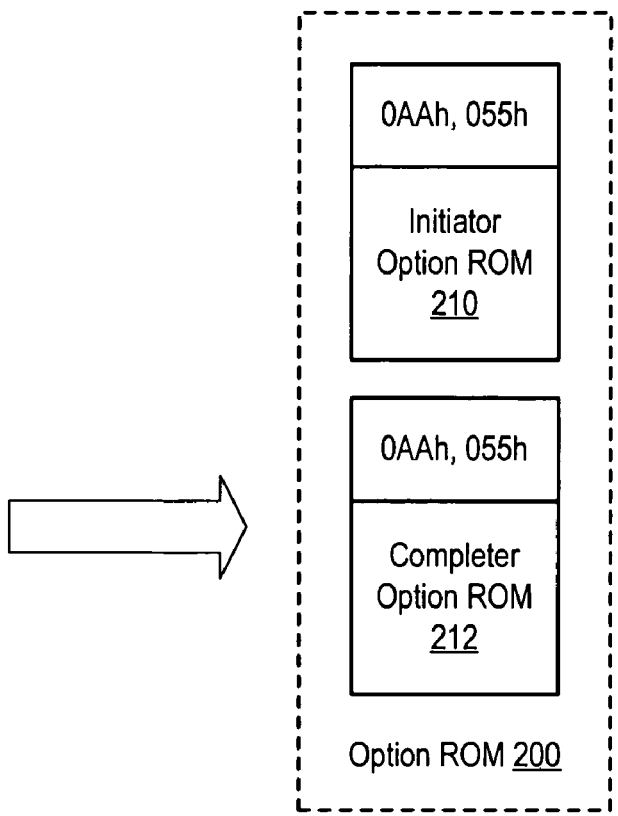
FIG. 2 shows a block diagram of a split option read only memory.

FIG. 2 shows a block diagram of a storage option read only memory 200. The storage option ROM 200 is configured as a split ROM architecture. More specifically, the storage option ROM 200 includes an initiator option ROM 210 and at least one completer option ROM 212. When an information handling system fabricator fabricates an information handling system that includes a peripheral device that would benefit from the split ROM architecture, the supplier of the peripheral device (or a storage option ROM vendor for the option ROM for the peripheral) provides the information handling system fabricator with the two Option ROMs to be integrated with and executed by the system BIOS 128.

For example, if the peripheral for which the split ROM architecture supports is a storage device, then when the information handling system initiates operation (either via a power-on operation or a reboot operation), the initiator option ROM 210 initializes the storage controller for the storage device and initiates a drive detection operation. The completer option ROM 212 completes the drive detection operation (including hard drive detection and logical drive detection), displays an option ROM banner and provides information on any detected drives.

Figure 3:
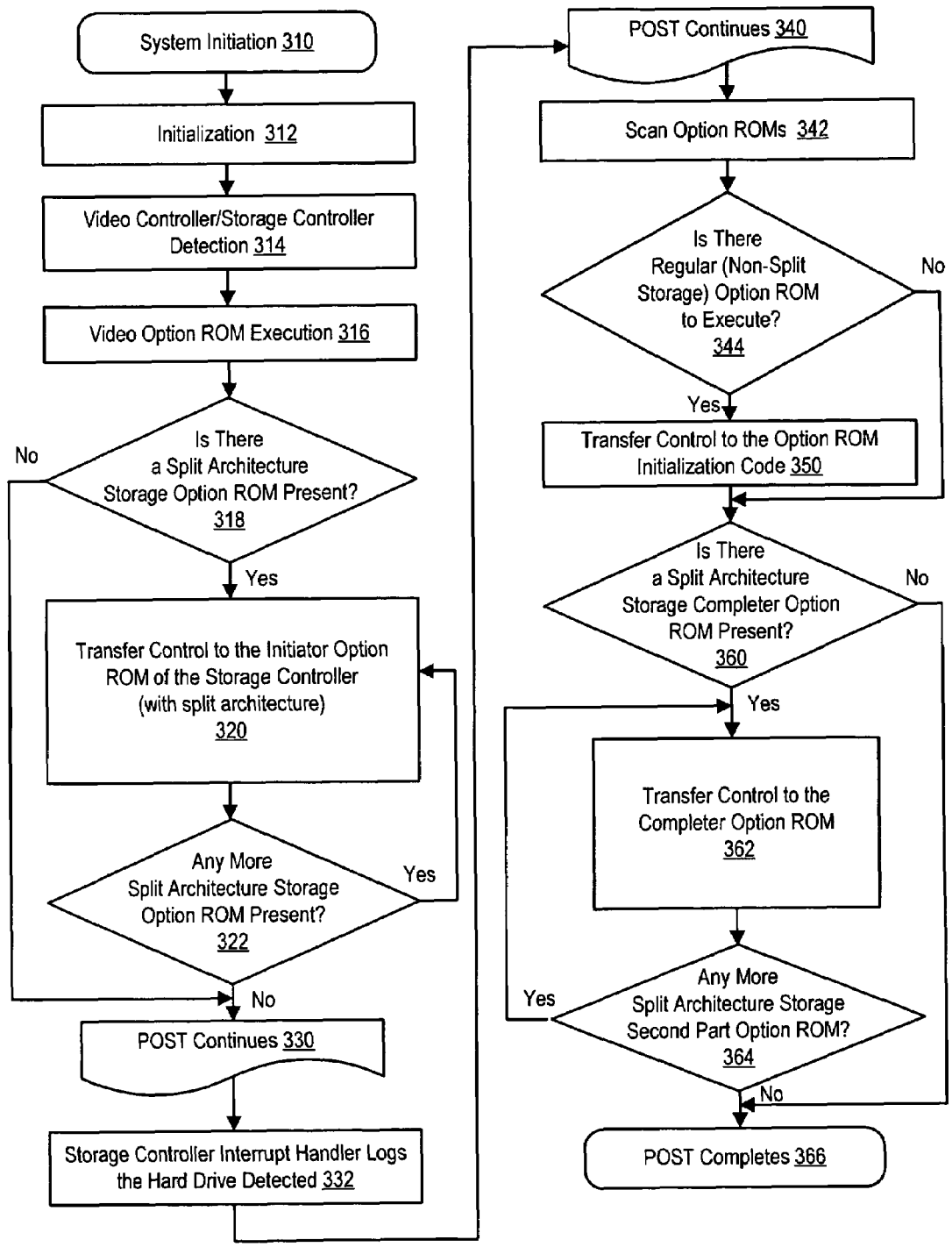
FIG. 3 shows a flow chart of the operation of an initiation of an information handling system having a split option ROM detection function.

Referring to FIG. 3, a flow chart of the operation of an initiation of an information handling system having a split option ROM detection function is shown. More specifically, when the information handling system is powered on at step 310, the BIOS 130 starts execution of a power on self test (POST) by performing a chipset initialization operation at step 312. Next, the POST performs a video controller and store controller detection operation at step 314. For example, the BIOS can scan the bus 112, such as a peripheral component interconnect (PCI) bus to determine what type of video controller is coupled to the bus. Next, the video option ROM for the appropriate video controller executes at step 316 to initialize the video controller.

The POST then determines whether a split storage option ROM is present at step 318. If a split storage option ROM is present, then the POST transfers control to the initiator ROM of the storage controller at step 320. The initiator ROM starts up the storage devices and sets up an interrupt handler for the storage device to monitor drive detection. The POST then determines whether any other split storage option ROMs are present at step 322. If there are additional split storage option ROMs present, then the POST transfers control to the initiator ROM for the additional storage device which starts up the corresponding storage device and sets up an interrupt handler for the additional storage device to monitor drive detection for the corresponding storage device.

If there was no split storage option ROM present, as determined by step 318, or no additional split storage option ROMs are present, as determined by step 322, then the POST continues execution at step 330. This continued execution includes POST tasks such as keyboard/mouse initialization, CPU detection, memory test, PXE option ROM initialization, etc. By starting the initiator option ROM and then continuing POST execution, the time for storage device spin-up is shared with other POST tasks. While the POST continues execution, when a storage device sets an interrupt to indicate that a drive has been detected, then the storage controller interrupt handler logs that the storage device has been detected at step 332 and the POST continues execution at step 340.

Next the POST scans the information handling system for additional option ROMs at step 342. POST determines whether there are any additional non-split option ROMs present at step 344. Examples of non-split option ROMs include conventional storage option ROMs, preboot execution environment (PXE) Base Code type option ROMs, and universal network device interface (UNDI) type option ROMs.

If a non-split option ROM is present, then the POST transfers control to the option ROM initialization code at step 350. The non-split option ROM then completes the initialization for the corresponding options.

Next, the POST determines whether a completer option ROM is present at step 360. By waiting until the non-split option ROMs complete execution, the POST saves additional execution time compared to waiting for the storage devices to complete initialization before completing the remainder of the POST operation. If a completer option ROM is present, then the POST transfers control to the completer option ROM at step 362. The completer option ROM performs a plurality of functions relating to the storage device such as concluding the storage device detection, building plug and play (PnP) headers for the storage device, displaying vendor banner for the storage device and displaying drive detection results for the storage device.

The POST then determines whether any other split storage option completer ROMs are present at step 364. If there are additional split storage option completer ROMs present, then the POST transfers control to the completer ROM for the additional storage device. After all of the completer ROMs have executed, then the execution of the POST completes at step 370.

By executing a POST in accordance with the present invention, significant time can be saved during the execution of the POST. For example, it has been determined that in a sample information handling system having a RAID controller, a RAID Option ROM can require three minutes to execute while the remainder of POST can require half a minute to execute. Without the use of a split option ROM, the overall POST execution time approaches three and a half minutes. With the use of a split option ROM, the POST time will decrease to approximately three minutes (a 14% improvement in POST execution time). Also for example, it has been determined that in a sample an information handling system having one RAID storage device and one SCSI controller device, the RAID Option ROM can require three minutes to execute, the SCSI controller device can require two minutes to execute while the remainder of the POST can require half a minute to execute. Without the use of a split option ROM, the overall POST execution time approaches five and a half minutes. With the use of split option ROMs for the storage devices, the POST time will decrease to approximately three minutes (a 45% improvement in POST execution time).

The present invention is well adapted to attain the advantages mentioned as well as others inherent therein. While the present invention has been depicted, described, and is defined by reference to particular embodiments of the invention, such references do not imply a limitation on the invention, and no such limitation is to be inferred. The invention is capable of considerable modification, alteration, and equivalents in form and function, as will occur to those ordinarily skilled in the pertinent arts. The depicted and described embodiments are examples only, and are not exhaustive of the scope of the invention.

For example, the above-discussed embodiments include software modules that perform certain tasks. The software modules discussed herein may include script, batch, or other executable files. The software modules may be stored on a machine-readable or computer-readable storage medium such as a disk drive. Storage devices used for storing software modules in accordance with an embodiment of the invention may be magnetic floppy disks, hard disks, or optical discs such as CD-ROMs or CD-Rs, for example as well as large scale data bases or data warehouses. A storage device used for storing firmware or hardware modules in accordance with an embodiment of the invention may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

Also for example, additional split option ROMs may be included within an information handling system. When an information handling system includes additional option devices and these devices include corresponding split option ROMs, then the POST execution time can be correspondingly reduced.

Also for example, split option ROMs may be used for other types of devices that slow the POST execution time. Thus split option ROMs may be used for PCI(e) type devices.

The POST execution time reduction can greatly improve customer experience as well as factory throughput.

Consequently, the invention is intended to be limited only by the spirit and scope of the appended claims, giving full cognizance to equivalents in all respects.

What is claimed is:

1. A method for reducing execution time for a power on self test (POST) of an information handling system comprising:
   providing the information handling system with a split option ROM, the split option ROM including an initiator split option ROM and a completer split option ROM;
   executing the initiator split option ROM upon execution of the POST, the initiator split option ROM starting initialization of an option corresponding to the initiator split option ROM, the option corresponding to the initiator split option ROM includes a storage device;
   executing the power on self test to initialize a remainder of the information handling system; and,
   executing the completer split option ROM after initializing the remainder of the information handling system, the completer option ROM completing initialization of the option corresponding to the completer split option ROM and completing initialization of the option includes building a plug and play header for the storage device.

2. The method of claim 1 wherein:
   starting initialization of the option includes starting up the storage device.

3. The method of claim 1 wherein:
   starting initialization of the option includes setting an interrupt handler for the storage device to monitor drive detection.

4. The method of claim 1 wherein:
   completing of the option includes completing storage device detection.

5. The method of claim 1 wherein:
   executing the power on self test includes executing a conventional system option read only memory.

6. An apparatus for reducing execution time for a power on self test (POST) of an information handling system comprising:
   a split option ROM, the split option ROM including an initiator split option ROM and a completer split option ROM;
   means for executing the initiator split option ROM upon execution of the POST, the initiator split option ROM starting initialization of an option corresponding to the initiator split option ROM, the option corresponding to the initiator split option ROM includes a storage device;
   means for initializing a remainder of the information handling system; and,
   means for executing the completer split option ROM after the remainder of the information handling system is initialized, the completer option ROM completing initialization of the option corresponding to the completer split option ROM and completing initialization of the option includes building a plug and play header for the storage device.

7. The apparatus of claim 6 wherein:
starting initialization of the option includes starting up the storage device.

8. The apparatus of claim 6 wherein:
starting initialization of the option includes setting an interrupt handler for the storage device to monitor drive detection.

9. The apparatus of claim 6 wherein:
completing of the option includes completing storage device detection.

10. The apparatus of claim 6 wherein:
initializing the remainder of the information handling system includes executing a conventional system option read only memory.

11. An information handling system comprising:
a processor;
an option coupled to the processor,
a memory coupled to the processor, the memory including a conventional system option read only memory (ROM) and a split option ROM, the split option ROM including an initiator split option ROM and a completer split option ROM;
the split option ROM including instructions which upon invocation of a power on self test (POST) start initialization of the option corresponding to the initiator split option ROM, the option corresponding to the initiator split option ROM includes a storage device;
a POST module, the POST module including instructions which initialize a remainder of the information handling system; and,
the completer split option ROM including instructions which complete initialization of the option corresponding to the completer split option ROM after initialization of the remainder of the information handling system so as to reduce execution time for the POST and completing initialization of the option includes building a plug and play header for the storage device.

12. The information handling system of claim 11 wherein:
starting initialization of the option includes starting up the storage device.

13. The information handling system of claim 11 wherein:
starting initialization of the option includes setting an interrupt handler for the storage device to monitor drive detection.

14. The information handling system of claim 11 wherein:
completing of the option includes completing storage device detection.

15. The information handling system of claim 11 wherein:
initializing the remainder of the information handling system includes executing a conventional system option read only memory.

* * * * *